US007685068B2

(12) United States Patent
Klein Twennaar

(10) Patent No.: US 7,685,068 B2
(45) Date of Patent: Mar. 23, 2010

(54) ARRANGEMENT AND METHOD FOR TELE-COMMERCE WITH CLIENT PROFILES

(75) Inventor: Robbert Frank Klein Twennaar, The Hague (NL)

(73) Assignee: Koninklijke KPN N.V., Groningen (NL)

( * ) Notice: Subject to any disclaimer, the term of this patent is extended or adjusted under 35 U.S.C. 154(b) by 1560 days.

(21) Appl. No.: 10/242,813

(22) Filed: Sep. 13, 2002

(65) Prior Publication Data

US 2003/0055675 A1    Mar. 20, 2003

(51) Int. Cl.
G06Q 40/00 (2006.01)
(52) U.S. Cl. .......................................... 705/40; 705/39
(58) Field of Classification Search .................. 705/40, 705/39
See application file for complete search history.

(56) References Cited

U.S. PATENT DOCUMENTS

| | | | | |
|---|---|---|---|---|
| 5,329,589 | A | * | 7/1994 | Fraser et al. ............. 379/91.02 |
| 5,526,409 | A | * | 6/1996 | Conrow et al. ........... 379/91.02 |
| 5,677,955 | A | * | 10/1997 | Doggett et al. ................. 705/76 |
| 5,778,178 | A | * | 7/1998 | Arunachalam .............. 709/203 |
| 5,878,141 | A | | 3/1999 | Daly et al. |
| 5,987,500 | A | * | 11/1999 | Arunachalam .............. 709/203 |
| 6,029,151 | A | * | 2/2000 | Nikander ...................... 705/39 |
| 6,032,133 | A | * | 2/2000 | Hilt et al. ...................... 705/40 |
| 6,070,150 | A | * | 5/2000 | Remington et al. ........... 705/34 |
| 6,230,287 | B1 | | 5/2001 | Evans et al. |
| 6,260,024 | B1 | * | 7/2001 | Shkedy ......................... 705/37 |
| 7,089,208 | B1 | * | 8/2006 | Levchin et al. ................ 705/39 |

FOREIGN PATENT DOCUMENTS

| | | |
|---|---|---|
| EP | 0 501 697 | 4/1999 |
| EP | 0 508 697 B1 | 4/1999 |
| EP | 1 109 138 | 6/2001 |
| WO | WO 97/45814 | 12/1997 |
| WO | WO 98/34203 | 8/1998 |
| WO | WO98/37524 | 8/1998 |
| WO | WO 98/42173 | 10/1998 |

OTHER PUBLICATIONS

ZDF: "Ubersicht uber Girokonten" ZDF Online, [Online] 2000, XP002189978 Retrieved from the Internet: URL: www.zdf.de/ratgeber/wiso/geld/anlage/08334/index.html> [retrieved on Feb. 12, 2002].

* cited by examiner

Primary Examiner—James Kramer
Assistant Examiner—Lindsay M. Maguire
(74) Attorney, Agent, or Firm—McDonnell Boehnen Hulbert & Berghoff LLP

(57) ABSTRACT

A system with a transaction operator processor (1) for supporting a business transaction, the business transaction, including at least receiving an order from a communication device (7(j)) of a client, and arranging for an automatic payment transaction associated with said business transaction from a client account to a merchant account; the system has at least one client service provider processor (5(i)) provided with a memory storing client profile data necessary for the business transaction and arranged to communicate the client profile data to the transaction operator processor (1) during the business transaction, the transaction operator processor (1) performing the business transaction upon receipt of the client profile data.

21 Claims, 6 Drawing Sheets

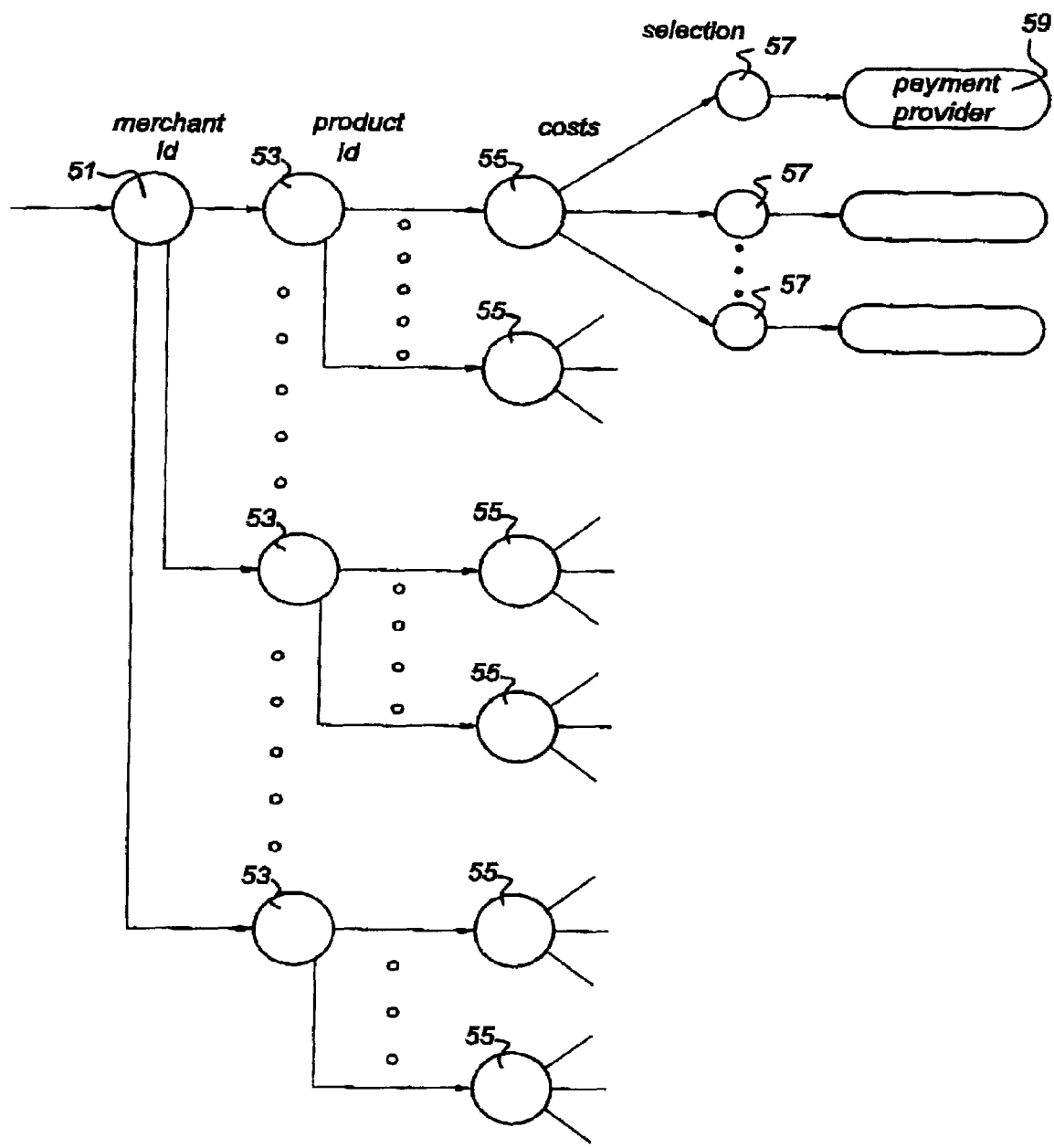

ARRANGEMENT AND METHOD FOR TELE-COMMERCE WITH CLIENT PROFILES

FIELD OF THE INVENTION

The present invention relates to a system comprising a transaction operator processor for supporting a business transaction, the business transaction including at least receiving an instruction from a communication device of a client, and arranging for an automatic payment transaction associated with the business transaction from a client account to a merchant account.

PRIOR ART

Such a system is known from, e.g., EP-B1-0.501.697.

SUMMARY

The object of the present invention is to improve the system known from the prior art in order to provide a more efficient and faster system.

To that effect, the system as defined above, further comprises at least one client service provider processor, preferably provided with a memory storing client profile data necessary for the business transaction and arranged to communicate the client profile data to the transaction operator processor during the business transaction, the transaction operator processor being arranged to perform the business transaction upon receipt of the client profile data. The transaction operator processor preferably is arranged to perform any transaction using at least one of the following features:
 a client Id identifying said client;
 a merchant Id identifying a merchant associated with said transaction;
 a debit amount associated with said transaction, and
 a transaction Id identifying said transaction..

By storing such client profile data necessary for the business transaction, the client need not provide that client profile data during the transaction anymore. Automatically transferring such client profile data from the client service provider processor to the transaction operator processor is a very fast process, thus, saving time during the transaction which is advantageous for all parties concerned: the client saves money since the transaction through the network is shorter, the client service provider provides better service and the transaction operator has more time available to deal with other transactions. These advantages are further enhanced by preprogramming predetermined ways of performing the transaction in dependence on at least one of the mentioned features.

The present invention also relates to a method to be performed by a system comprising a transaction operator processor for supporting a business transaction, the business transaction including at least receiving an instruction from a communication device of a client, and arranging for a automatic payment transaction associated with the business transaction from a client account to a merchant account, where the system also comprises at least one client service provider processor provided with a memory storing client profile data necessary for the business transaction and the method comprising the step of communicating the client profile data to the transaction operator processor during the business transaction, performing the business transaction upon receipt of the client profile data, and preferably performing any transaction using at least one of the following features:
 a client Id identifying said client;
 a merchant Id identifying a merchant associated with said transaction;
 a debit amount associated with said transaction, and
 a transaction Id identifying said transaction.

BRIEF DESCRIPTION OF THE DRAWINGS

The invention will be explained with reference to some drawings which are intended to illustrate the invention and not to limit its scope.

FIG. 5 shows a schematic flow diagram indicating how to store subscriber profiles.

DESCRIPTION OF A PREFERRED EMBODIMENT

General Overview

Figure 1:
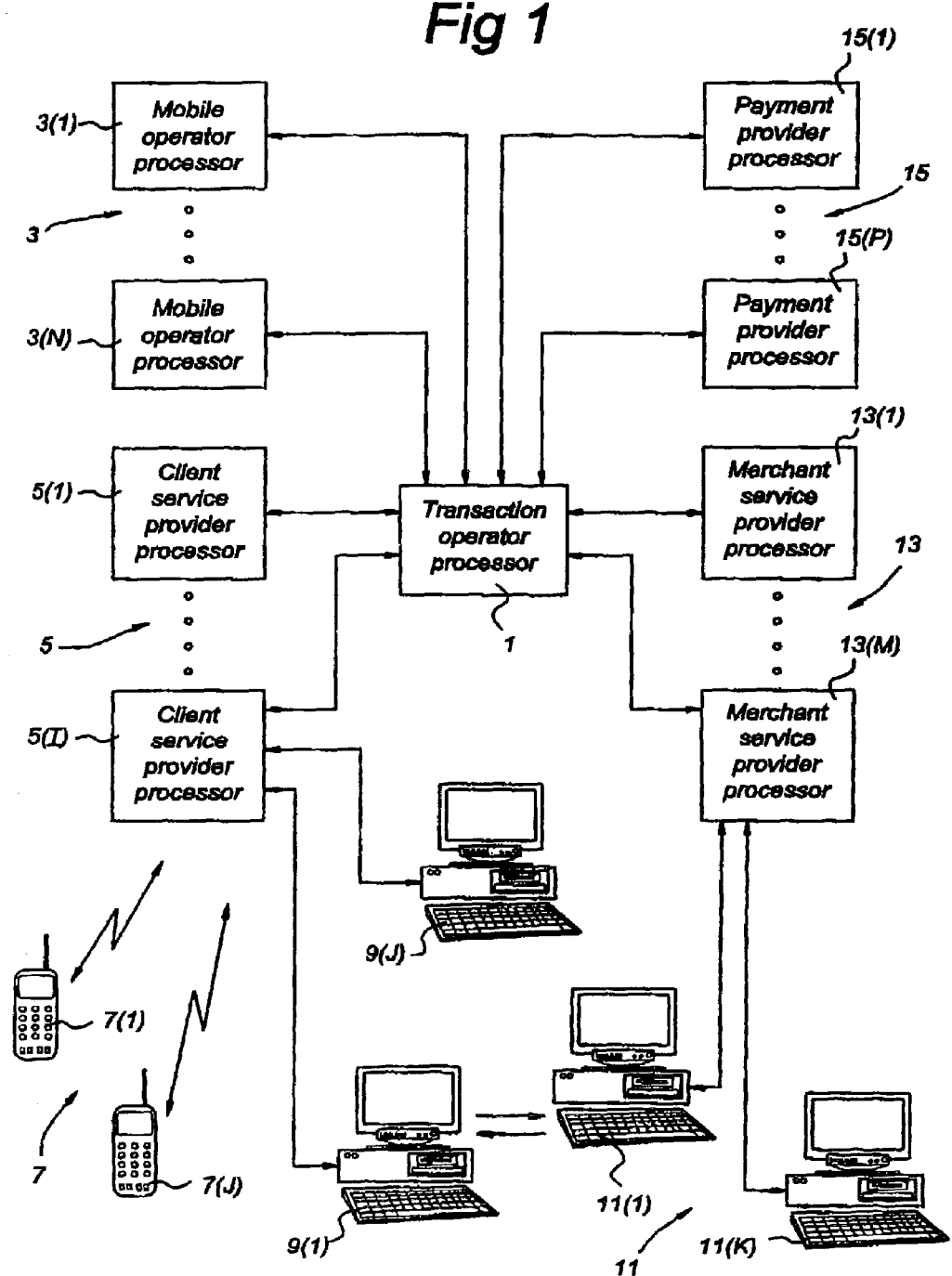
FIG. 1 gives an overview of the system according to a preferred embodiment of the present invention.

A transaction operator processor 1 operates as a processor of a trusted third party. As shown in FIG. 1, the system comprises mobile operator processors $3(n, n=1, \ldots, N)$, a plurality of payment provider processors $15(p, p=1, \ldots, P)$, a plurality of client service provider processors $5(i, i=1, \ldots, I)$, a plurality of merchant service provider processors $13(m, m=1, \ldots, M)$, a plurality of mobile telephones $7(j, j=1, \ldots, J)$, a plurality of personal computers $9(j, j=1, \ldots, J)$, and a plurality of personal computers $11(k, k=1, \ldots, K)$.

The personal computers $9(j)$, i.e. client terminals, are shown to be the same in number J as there are mobile telephones $7(j)$. This is done to indicate that the personal computers $9(j)$ are associated with the owners of the mobile telephones $7(j)$ concerned. However, in reality, the numbers of mobile telephones $7(j)$ and personal computers $9(j)$ may differ. Moreover, the personal computers $9(j)$ may be substituted by any other kind of terminal providing the user with the option to communicate with other processors in the system shown in FIG. 1.

The personal computers $11(k)$. i.e. merchant terminals, are associated with merchants. However, they can be substituted by any other type of terminal providing merchants with the possibility to communicate with other processors in the system shown in FIG. 1.

The connections shown in FIG. 1 are indicated with fixed lines to show that there are communication routes between the different components shown in FIG. 1. These communication routes may be partially physical, and partially wireless as is know to the persons skilled in the art. At least the communications from and to the mobile telephone $7(j)$ are partially carried out through a mobile network, as is known to a person skilled in the art. The mobile network is operated by mobile operators who are provided with the mobile operator processors $3(n)$.

Payments to be made by clients who wish to purchase a good or to obtain a certain service are to be carried out by the payment provider processors 15(p).

The personal computers 11(k) are located at the premises of the merchants and are arranged to send information to other processors in the system and to receive information from them.

The client service provider processors 5(i) and the merchant service provider processors 13(m) are preferable separate entities. Their purpose will be illustrated in the description below.

Figure 2:
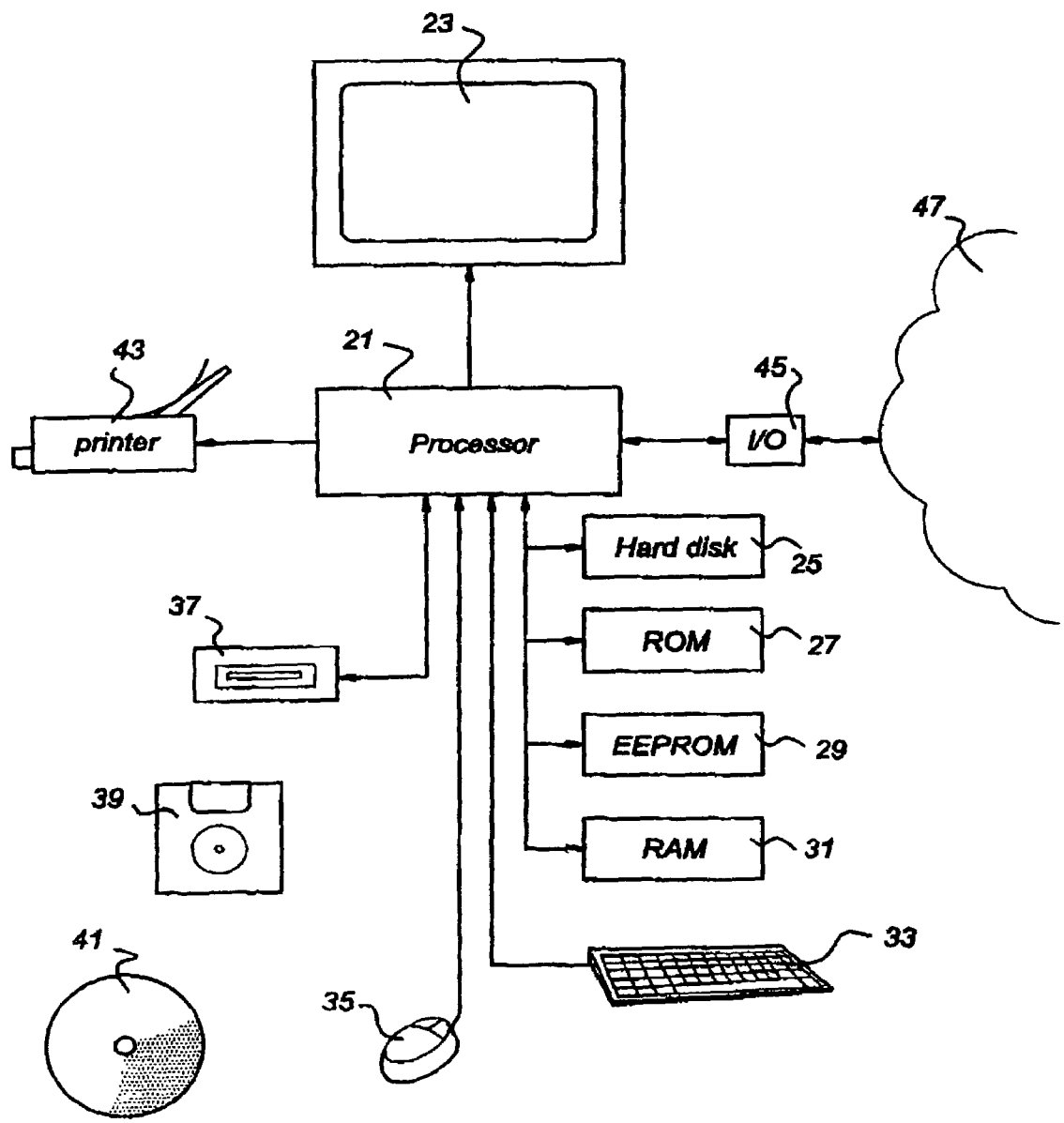
FIG. 2 gives an overview of a general computer arrangement that can be used for implementing any of the processors shown in FIG. 1.

Any of the processors in the system according to FIG. 1 may be arranged as shown in FIG. 2.

In FIG. 2, an overview is given of a computer arrangement that can be used to carry out the method according to the invention. The arrangement comprises a processor 21 for carrying out arithmetic operations.

The processor 21 is connected to a plurality of memory components, including a hard disk 25, Read Only Memory (ROM) 27, Electrically Erasable Programmable Read Only Memory (EEPROM) 29, and Random Access Memory (RAM) 31. Not all of these memory types need necessarily be provided. Moreover, these memory components need not be located physically close to the processor 21 but may be located remote from the processor 21.

The processor 21 is also connected to means for inputting instructions, data etc. by a user, like a keyboard 33, and a mouse 35. Other input means, such as a touch screen, a track ball and/or a voice converter, known to persons skilled in the art may be provided too.

A reading unit 37 connected to the processor 21 is provided. The reading unit 37 is arranged to read data from and possibly write data on a data carrier like a floppy disk 39 or a CDROM 41. Other data carriers may be tapes, DVD, etc, as is known to persons skilled in the art.

The processor 21 is also connected to a printer 43 for printing output data on paper, as well as to a display 23, for instance, a monitor or LCD (Liquid Crystal Display) screen, or any other type of display known to persons skilled in the art.

The processor 21 may be connected to a communication network 47, for instance, the Public Switched Telephone Network (PSTN), a Local Area Network (LAN), a Wide Area Network (WAN), etc. by means of I/O means 45. The processor 21 may be arranged to communicate with other communication arrangements through the network 47.

The processor 21 may be implemented as stand alone system, or as a plurality of parallel operating processors each arranged to carry out subtasks of a larger computer program, or as one or more main processors with several subprocessors. Parts of the functionality of the invention may even be carried out by remote processors communicating with processor 21 through the network 47.

The system of FIG. 1 is arranged to support mobile communication services and is directed to two kinds of groups: clients and merchants.

Mobile payment is a supporting service for (financial) transactions between clients and merchants.

Clients can use their mobile telephones 7(j) having an account with one of the payment providers associated with payment provider processors 15(p) communicating with the transaction operator processor 1. Clients must be registered in one of the client service provider processors 5(i) before they can use the system for any (financial) transaction using their mobile telephones 7(j). Then, a client does not need any cash in his pocket anymore. Moreover, the client service provider processors 5(i) are arranged to produce transaction overviews for their clients and may be arranged to provide (new) loyalty possibilities.

Merchants can provide services and goods to client. They are supported by their own personal computer 11(k). Any merchant wishing to take part in the system is registered with one of the merchant service provider processors 13(m) associated with a merchant service provider. Merchants can also be provided with their own (mobile) telephones and use these to transmit (orally) agreed transactions to the transaction operator processor 1.

By means of their respective client service provider processor 5(i) each client service provider supports services to its own group of clients. As mentioned before, not just anybody having a mobile telephone can use the system according to FIG. 1. Anyone wishing to use the system must be registered with one of the client service providers processors 5(i). The client service providers are arranged:

to store client profiles.
    to provide client related business transaction overviews;
    to offer customer care to the clients, i.e. through a client oriented help-desk function;

The merchant service provider processors 13(m) are arranged to offer a similar service to the merchants. Any of the merchants wishing to have the advantages of the system is registered in one of the merchant service provider provider processors 13(m). The merchant service provider processors 13(m) are arranged to:

to store merchant profiles;
    to provide merchant related business transaction overviews;
    to provide customer care to merchants, i.e. for instance to provide a merchant orientated help-desk function;

Thus, the system of FIG. 1 provides a clear and open structure for different parties who wish to be involved in mobile transactions. The transaction operator processor 1 is arranged to communicate with all the different processors and is the hart of the system. Preferably, the client service provider processors 5(i) are not allowed to communicate directly with one of the merchant service provider processors 13(m). All communications are preferably be routed through the transaction operator processor (1). However, it is observed that the mobile telephone 7(j) may communicate with the transaction operator processor 1 via a client service provider processor 5(i) or may communicate with the client service provider processor 5(i) via the transaction operator processor 1. The same may be true for communications with the client terminals 9(j) (and merchant terminals 11(k)).

Moreover, when a transaction between a client and merchant takes place the client service provider processor 5(i) at which the client is registered is not active. The merchant server provider processors 13(m) support the electronic shop for those merchants who are registered with them. They may be arranged to support any known technique to provide a virtual shopping area, like IVR/SMS/MMS/USSD/WAP/I-mode (IVR=Interactive Voice Response, SMS=Short Message Service, MMS=Multi Media Message Service; USSD=Unstructured Supplementory Services Data, WAP=Wireless Application Protocol).

Actually, any Internet Protocol (IP) based network may be used for that purpose, as well as any technique available for that.

The merchant service provider processors 13(m) are normally not involved during a transaction between a client and a merchant. The merchant service provider processors 13(m) are only arranged to retrieve data and transaction data of the merchants from the transaction operator processor 1. However, in an alternative embodiment, the merchant service provider processors 13(m) store merchant profiles in their memories. Such a merchant profile could, e.g., include information as to which payment method (e.g. credit card, debit card) a merchant concerned is accepting from a client in dependence on the amount of money associated with a certain service (or delivery of a good). This mechanism will be explained in detail for client service provider processors 5(i) but may, thus, be present be a similar way for merchant service provider processors 13(m) too.

In accordance with a special feature of the present invention, the client service provider processors 5(i) are arranged to receive complaints of clients with respect to merchants as specified by the clients. At the same time, preferably, the merchant service provider processors 13(m) are arranged to receive complaints from merchants with respect to clients as specified by the merchants.

The merchant service provider processors 13(m) may be provided with databases to provide special services to the merchants, such as financial administration.

The mobile operator processors 3(n) are arranged to guarantee mobile transactions and to provide user interfaces therefor.

The main tasks of the transaction operator processor 1 is to support the establishment of a direct link between a client and a merchant to carry out a transaction, and to route transaction payment data to one of the payment provider processors 15(p). The payment provider processor 15(p) to pay for a transaction is the one that has the account of the client wishing to receive a good or service. It may well be that two payment provider processors 15(p) are involved in the payment process, i.e., then when the merchant from which the goods or services are requested has his account with another payment provider processor 15(p) than does the client.

In more detail, the tasks of the transaction operator processor 1 may be:
- to load client profile data from a client service provider processor 5(i);
- to load merchant profile data from a merchant service provider processor 13(m);
- to log client data
- to log merchant data
- to verify merchants
- to verify clients
- routing a transaction between a client's mobile telephone 7(j) and a merchant's terminal
- to route transaction payment data to the correct payment provider(s)
- to register results of transactions
- to provide transaction results to merchants
- to provide transaction results to clients
- to provide a predetermined access to its database to the client service provider processors 5(i)
- to provide a predetermined access to its database to merchant service provider processors 13(m)
- to support communication between the different processors shown in FIG. 1 (as well as the mobile telephones).

Detailed Overview

Figure 3:
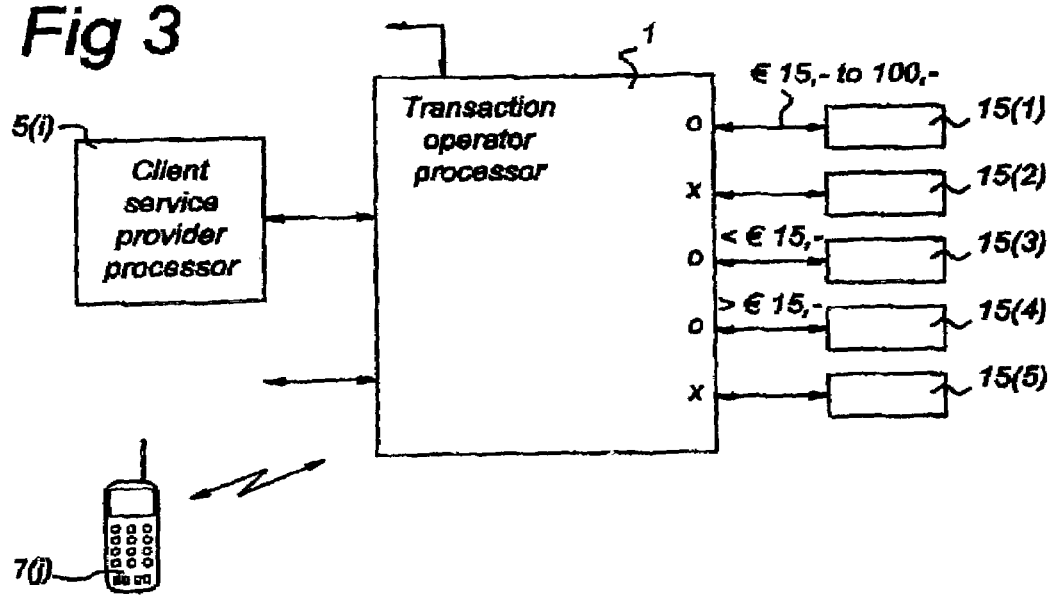
FIG. 3 shows a first level of client profiles used in preferred embodiment of the present invention.

FIG. 3 shows a first level of profiles. Each of the client service provider processors 5(i) has stored in its memory profile data of subscribers to the client service provider related to the client service provider processor 5(i) concerned. These profile data specifies, a.o., at which payment providers the subscriber has one or more accounts. In FIG. 3, it is shown that there are, e.g., five payment provider processors 15(1), . . . 15(5). A certain subscriber has only accounts with the payment providers associated with the payment provider processors 15(1), 15(3), and 15(4). An indication thereof is stored in the memory of the client service provider processor 5(i) concerned. Consequently, when consulting the client service provider processor 5(i), the transaction operator processor 1 will automatically close the communication path to the payment provider processors 15(2), 15(5). The data for this is transmitted from the client service provider processor 5(i) to the transaction operator processor 1 whenever the subscriber concerned tries to carry out a transaction.

By blocking automatically the communication path to the payment provider processors 15(2), 15(5), the number of options to be provided by the transaction operator processor 1 to the subscriber concerned (i.e. to his mobile device 7(j)) is reduced resulting also in time gain.

Blocking of the communication path to payment provider processors 15(2), 15(5) has been indicated in FIG. 3 by an "x" in the transaction operator processor 1. Unblocked communication paths have been indicated with an "o".

In a second level of subscriber profiles, the client service provider processor 5(i) stores in its memory for its subscribers financial data indicating how the payment should be performed in depence on the amount of money to be paid. E.g., these financial data may indicate for which amount of money which one of the payment provider processors 15(1), 15(3), 15(4) is allowed to pay. For instance, as schematically indicated in FIG. 3, the client service provider processor 5(i) stores in its memory for a certain subscriber that instructions for an automatic debit transaction for amounts lower then 15 € should be sent to payment provider processor 15(3), amounts between 15 and 100 € to payment provider processor 15(1) or 15(4), whereas payment instructions for amounts above 100 € should be sent to payment provider processor 15(4). Of course, these values are examples only. Everybody will be allowed to define his/her own settings.

Consequently in this example, for many transactions, inputting the debit amount for the transaction concerned on the mobile telephone 7(j) automatically results in a debiting procedure with one of the payment provider processors 15(1), 15(3), 15(4). No further questions need to be asked to the user of the mobile telephone 7(j) Dependent on the payment provider, a password/PIN code (Personal Identification Number) can be requested from the user. Most, or all of the question/answer transactions between the transaction operator processor 1 and the mobile telephone 7(j) can then be omitted, resulting in a higher transmission speed.

Similar advantages can be obtained by other features on this second level. To that end, in the transaction operator processor 1 any transaction is coupled to at least one of the following basic features:
- client Id
- merchant Id
- debit amount
- transaction Id
- product Id (optional)

Instead of, or in addition to storing such debit amounts in the client service provider processor memories for each of the subscribers, as indicated above, the transaction operator processor 1 may then be programmed to select one of the payment provider processors 15(1) . . . 15(5) based on such a merchant Id and/or product Id. The merchant Id will, normally, identify a merchant, however, it can also identify a group of merchants (e.g. petrol station holders). Similarly, the product Id can refer to a product group (like "petrol") instead of only one individual product.

The client may be allowed to set which one of these features is leading. As indicated, the value of the debit amount may be leading. However, alternatively, one of the other features may be leading, e.g., merchant Id or transaction Id. For instance, in some situations making the merchant Id leading may be preferred. E.g., paying at a petrol station (merchant Id=name of petrol company) may be set to be done by credit card only independent of the value to be paid. As a further alternative, it may be set that paying at a petrol station can be performed in two ways: e.g., payments below 20 € via debit card and above 20 € via credit card. For other merchants this threshold may be set to a default of 50 €.

A client may also receive a message from the system when, e.g., a certain debit amount is exceeded, for instance when not enough credit is available anymore or when his credit card does not allow for payments above a certain threshold. This may result in asking the client to indicate what other payment method is to be used and receiving from the client instructions to that effect. Instead of asking the client what other payment method is to be used, the transaction operator processor 1 may be programmed to automatically select another payment method under those circumstances. The client may be warned that such other payment method has been used.

Moreover, it is emphasized that a client may be warned if his account is below a predetermined value and that the client is asked for taking appropriate measures. These measures may be part of a set of measures preprogrammed in the client service provider processor $5(i)$. This set of measures may be presented to the client who then only needs to indicate one of the presented options. Options may, e.g., be: deposit of credit to an account of a certain payment provider or changing the personal settings in the client service provider processor $5(i)$ in case the payment method can not meet the set financial profiles. So, e.g., if a client whishes to set that all amounts above 600 Euro are to be paid via a predetermined payment provider processor $15(p)$ and the maximum limit of this payment provider processor $15(p)$ is only 500 Euro, then the client may be warned that his requested setting is impossible. This may also occur when the payment provider associated with payment provider processor $15(p)$ decides to decrease this limit.

A third level of client profiles may relate to access/approval menus for obtaining access to one or more of the payment provider processors $15(p)$. Such access menus and approval menus may be transmitted to the mobile telephone $7(j)$ of the user who has to reply to questions asked to get access to one of the payment provider processors $15(p)$. However, data as to these access/approval menus may also be stored in the client service provider processor memory and transmitted automatically to the transaction operator processor 1 during a transaction. Then, the transaction operator processor 1 can use this information to automatically get access to one of the payment provider processors $15(p)$. Such access/approval menus may also indicate which payment method is to be used when the payment provider processor $15(p)$ supports different payment methods.

There may be two kinds of payment providers. The first type of payment providers will have their payment provider processors $15(p)$ connected to the transaction operator processor 1, and this payment provider processors $15(p)$ are only accessible to clients via the transaction operator processor. The second type of payment providers have payment provider processors $15(p)$ that are connected to the transaction operator processor 1 but are directly accessible to clients. This third level of client profiles is especially advantageous for these latter payment providers, since this third level of client profiles allows the clients to access these payment provider processors $15(p)$ by using the preset access/approval menus. These access and approval menus may comprise names to log in to the payment provider processor $15(p)$ including passwords to do so. For instance, some banks provide the option to users to log in via the Internet and to pay via the Internet. One is, e.g., allowed to choose between debit card and credit card payments. So, in this third level of client profiles, it may be possible that the access and approval menus provide access to a bank wallet by means of which it is indicated which payment method within this wallet may be used (debit card or credit card). This may be organized with a same or similar set of rules as discussed with reference to the second level of client profiles.

Figure 4:
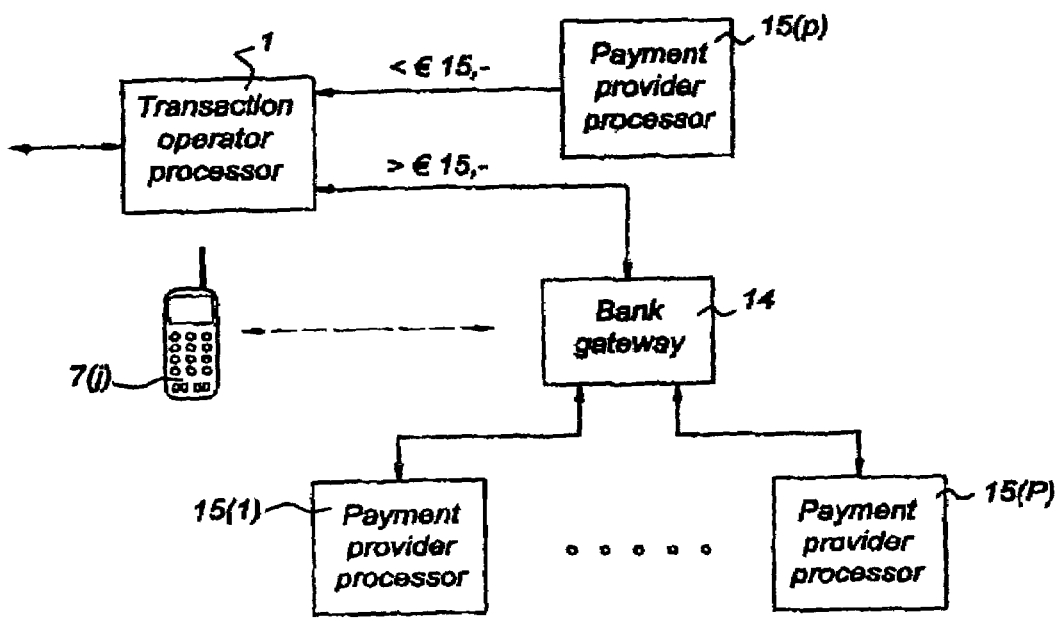
FIG. 4 shows an alternative system for the system of FIG. 1, using a bank gateway.

FIG. 4 shows an alternative system for the system of FIG. 1 in which use is made of a bank gateway 14. FIG. 4 shows that the transaction operator processor 1 may also be connected to a bank gateway 14 which is itself connected to one or more of the payment provider processors $15(1) \ldots 15(P)$. Such a bank gateway 14 may coordinate functionality of the different payment provider processors $15(1) \ldots 15(P)$. For instance, the bank gateway 14, that may be arranged in a similar way as the arrangement shown in FIG. 2, comprises one or more bank profiles that are common to the payment provider processors $15(1) \ldots 15(P)$ connected to the bank gateway 14.

Instead of one bank gateway 14 there may be provided more than one bank gateway.

It is envisaged that, at a certain moment in time, the transaction operator processor 1 transfers communication between itself and a mobile telephone $7(j)$ of a client to the bank gateway 14, such that there is a direct communication channel between the bank gateway 14 and the mobile telephone $7(j)$ external from the transaction operator processor 1. Then, the user of the mobile telephone $7(j)$ is directly communicating with the user interface of the bank gateway 14. Moreover, then it is possible that the mobile telephone $7(j)$ is directly communicating with one of the payment provider processors $15(p)$ via the bank gateway. The same may, then, be true for the communication between the transaction operator processor 1 and one of the payment provider processors $15(p)$. Then, the bank gateway 14 is transparent and operates more or less as a switch.

FIG. 4 also shows that there is still a direct connection with at least one payment provider processor $15(p)$. Of course, there may be more such direct connections with other payment provider processors. Such a direct connection may, for instance, exists for payments for an amount of <15 €, whereas all payments for an amount of more than 15 € will automatically be transferred to the bank gateway 14. Each of the payment provider processors $15(1) \ldots 15(P)$ support one or more payment processes, like paying by debit card, paying by credit card and/or "micropayments", for instance for amounts up to 15 €.

FIG. 5 shows a schematic flow diagram to explain the mechanism of storing subscriber profiles in the client service provider processor $5(i)$. It reflects a decision tree implemented by, e.g. a computer interface asking questions to the subscriber. The tree reflects the order in which these questions are, preferably, asked.

Anybody wishing to be a subscriber to one of the client service providers associated with the client service provider processors $5(i)$ is starting a communication with a desired client service provider processor $5(i)$. Entering information may be done by the mobile telephone $7(j)$. However, since it might relate to a rather large quantity of information it is preferred that the client is able to communicate this information to the desired client service provider processor $5(i)$ with his computer arrangement $9(j)$. During the communication between the client service provider processor $5(i)$ and, e.g., the computer arrangement 9(j), the client is asked to input a merchant Id, step 51, after the client service provider processor 5(i) has received a client Id. The client Id may be the same as or a number based on the CLI (Calling Line Identification) of the telephone number used by the client. However, alternatively, any other client Id may be used. The client enters the merchant Id's of all merchants from which he desires services in the future. I.e., he enters at least merchant Id's of those merchants for which he wishes the profile data to be stored in the client service provider processor 5(i) knowing that storing this information will help him in the future to use the system in a faster and more efficient way. It is observed that the client need not enter merchant Id's necessarily. He may decide to jump directly to the product Id's.

Then, the client is asked to enter product Id's of all those products and services that he will most probably use in the future, step 53. The product Id's will be stored in association with the merchant Id's where the product/service can be obtained. After this, the client service provider processor 5(i) asks the client to input the costs per product/service, step 55. The costs are stored in the memory of the client service provider processor 5(i) in association with the product Id's concerned. Again, the client may decide not to specify product.Id's and to jump to the next question.

Then, in step 57, the client service provider processor 5(i) asks the client whether or not he likes to make a selection for a payment provider to be specified in dependence on the value of the costs. For instance, for an amount of money below 15 €, the client may specify that the debit note is sent to a predetermined payment provider, whereas for amounts between 15 and 100 € the debit note is to be sent to another payment provider. Additionally, amounts higher than 100 € may be debited to further payment providers to be specified by the client. In step 59, the client can specify these payment providers, e.g., by providing the client a list with options of possible payment providers from which he can select one or more.

Transaction Initiation

There are several possibilities of initiating a transaction. FIGS. 6a, 6b, 6c and 6d show different possibilities therefore.

Figure 6A:
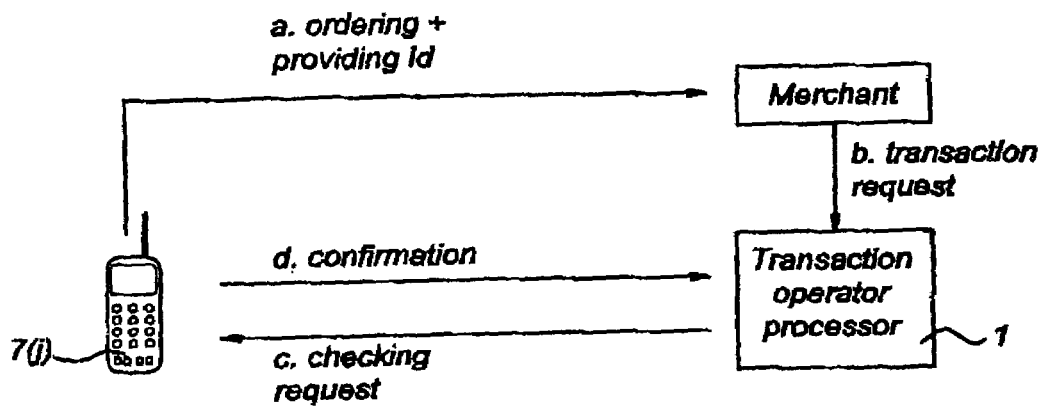
FIGS. 6a, 6b, 6c and 6d show different possibilities of initiating a business transaction with the system according to preferred embodiments the invention

FIG. 6a schematically shows interactions between the mobile telephone 7(j) of a subscriber wishing to start a transaction, a merchant and the transaction operator processor 1. It is observed that the merchant has been indicated schematically by a block in FIGS. 6a, 6b, 6c and 6d. This is to indicate that the merchant can be one of the merchant terminals 11(1) . . . 11(K) operating fully automatically, as shown in FIG. 1. However, alternatively, the merchant as indicated in FIGS. 6a, 6b, 6c and 6d might be a human being receiving instructions from a subscriber through a telephone call with the subscriber. In this latter case, data to be transmitted from the merchant to the transaction operator processor 1 may be generated by the keys of a telephone handset using, e.g., a DTMF coding format, as is known to persons skilled in the art. Of course, when the merchant in FIGS. 6a, 6b, 6c and 6d is the merchant terminal 11(k) there may be some additional human intervention during the transaction, whenever required. Such human intervention can be done by means of, e.g., a keyboard or a mouse, etc.

FIG. 6a shows an initiation scheme in which the merchant initiates the transaction request. The steps are as follows:

a. A subscriber transmits an order for a service or a good to the merchant by means of his mobile telephone 7(j). At the same time he provides his client Id to the merchant. His client Id may be, for instance, the Id number of his SIM (Subscriber Identity Module) number of the SIM card in his mobile telephone 7(j). Alternatively, this client Id may be the telephone number associated with the subscriber.

b. The merchant sends a transaction request to the transaction operator processor 1. This transaction request has a one-to-one relationship with the order received from the subscriber in step a.

c. The transaction operator processor 1 checks the transaction request by sending a checking request to that effect to the mobile telephone 7(j) of the subscriber.

d. If the subscriber agrees with the content of the checking request, he sends a confirmation for the transaction to the transaction operator processor 1. Note, that the checking request may be in the form of an SMS or USSD message displayed on the display of the mobile telephone 7(j). Also the confirmation to be transmitted to the transaction operator processor 1 may have the form of an SMS message.

Figure 6B:
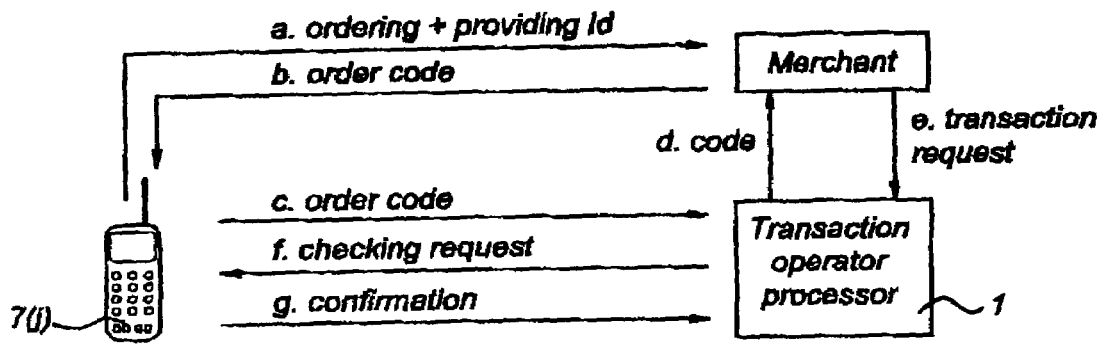

FIG. 6b shows an initiation of a transaction, which is consumer initiated.

The steps carried out are as follows:

a. The subscriber sends an order for the service or good to the merchant. Optionally, he also provides his client Id to the merchant. This order may be sent by mobile telephone 7(j) or by any other communication device (e.g., g(j)). The order may even be given orally, e.g., when shopping in a physical shop.

b. The merchant replies by sending back an order code which is a unique identification of the service or the good requested for. The order code may be transmitted to the mobile telephone 7(j) (or any other device like g(j)) or even given orally in shop (or in the form of an order code on paper e.g. in a closed envelope).

c. The subscriber calls the transaction operator processor 1. Then, he transmits the order code received to the transaction operator processor 1.

d. Upon receiving such an order code, the transaction operator processor 1 transmits the order code to the merchant.

e. Upon receiving the order code from the transaction operator processor 1, the merchant recognizes this order code and replies by transmitting transaction data to the transaction operator processor 1.

f. Optionally, the transaction operator processor 1 checks with the subscriber whether or not it is allowed to carry out the transaction by transmitting a checking request to the mobile telephone 7(j). This may be in the form of an SMS message.

g. After having received the checking request, the subscriber transmits a confirmation with his mobile telephone 7(j) to the transaction operator processor 1.

As a further alternative, the order code is generated by the transaction operator processor, after the merchant has sent the transaction request to transaction operator processor 1. Then, the merchant sends the order code to the client who sends it to transation operator processor 1.

Figure 6C:
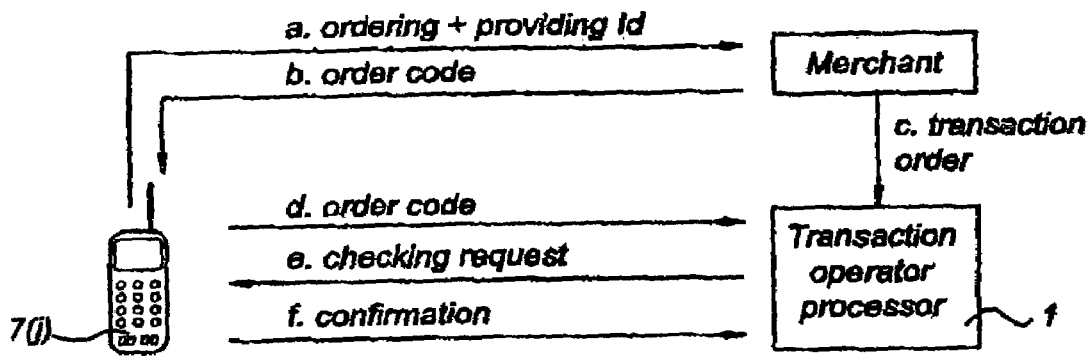

FIG. 6c shows an initialization scheme in which both the subscriber and the merchant initiate the transaction. The steps are as follows:

a. The subscriber transmits an order for a service or good, optionally, together with his client Id, to the merchant, in a similar way as in FIG. 6b.

b. The merchant replies by transmitting an order code to the subscriber, in a similar way as in FIG. 6b.

c. The merchant also transmits an order for the transaction to the transaction operator processor 1.

d. The subscriber transmits the order code as received by means of his mobile telephone 7(j) to the transaction operator processor 1. Then the transaction operator processor 1 knows that he is allowed to start the transaction.

e. Optionally, to provide a higher level of security, the transaction operator processor 1 sends a checking request to the mobile telephone 7(j).

f. After having received the checking request, the subscriber uses his mobile telephone 7(j) to transmit a confirmation to the transaction operator processor 1.

Figure 6D:
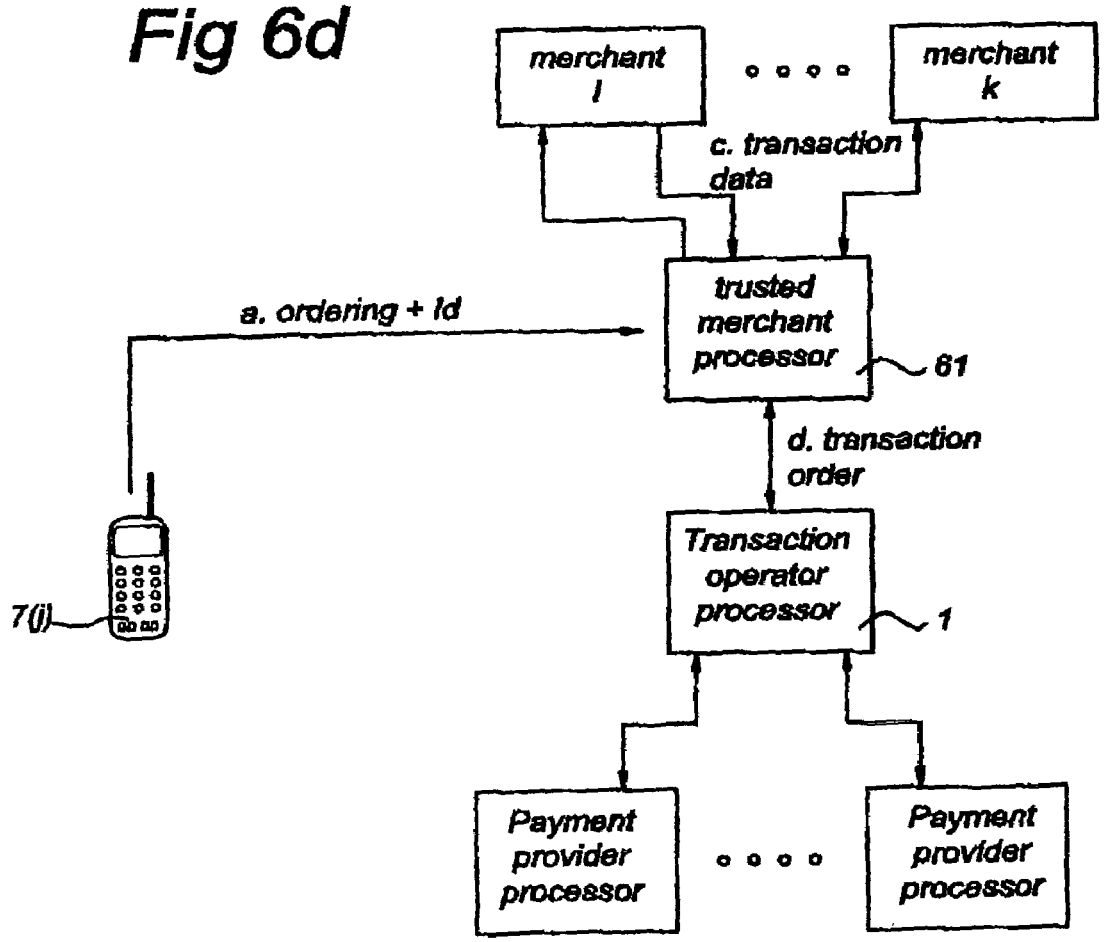

FIG. 6d shows a fourth possible scheme for initiation of a transaction. In this scheme, use is made of a further processor, i.e., a trusted merchant processor 61 that may be operated by the operator of the transaction operator processor 1. The trusted merchant processor 61 may be a distinct processor located elsewhere than the transaction operator processor 1. However, optionally, the trusted merchant processor 61 may actually be one and the same processor as the transaction operator processor 1. In the latter case, FIG. 6d is an indicating that there is additional functionality to the functionality provided by the transaction operator processor 1, as already discussed above.

The initiation process is now as follows:

a. A subscriber starts the process by sending an order for the service or good to the trusted merchant processor 61. He also transmits his client Id to the trusted merchant processor 61.

b. The trusted merchant processor 61 analyses the order and transmits the order to the merchant who is able to provide the service or good requested.

c. The merchant transmits the transaction data associated with the order to the trusted merchant processor 61.

d. The trusted merchant processor 61 transmits the order for the transaction to the transaction operator processor 1. Since the order is received from a trusted merchant processor 61, the transaction operator processor 1 does not need to check the correctness of the order with the subscriber and directly starts the transaction as requested.

e. After having received information from one of the payment provider processors as to a correct debiting procedure, the transaction operator processor 1 sends an instruction to inform the trusted merchant processor 61 thereof, which itself informs the merchant concerned accordingly.

The scheme of FIG. 6d is especially advantageous in situations where a subscriber wishes to order something cheap, e.g., some fruit juice bottle from a vending machine. Then, the subscriber only needs to input, e.g., a code shown on the vending machine and the remainder of the transaction will be dealt with fully automatically by the system. After the payment process has ended, the vending machine will provide the fruit juice bottle to the subscriber.

Operation

To clients, the system of FIG. 1 may, for example, operate in the following way. Through an IVR, a sticker on a vending machine or an Internet ordering form, e.g., a transaction number may be generated by an Internet merchant. This transaction number is related to a specific service or good. The client receives data as to the amount of money to be paid for. This may be done through the IVR, the sticker on the vending machine or a message on a web site. When the client is ready to pay this amount of money for the specific good or service he inputs the transaction number with his mobile telephone 7(j) which is transmitted to the transaction operator processor 1. The transaction operator processor 1 receiving the transaction number recognizes this number and checks with the merchant the prize of the good or service. The transaction operator processor 1 transmits the prize to the payment provider processor 15(p) having a banking account of the owner of the mobile telephone 7(j). If the amount of money on the banking account allows payment, the payment provider processor 15(p) will pay the amount of money to the account of the merchant concerned. As mentioned before, the account of the merchant may well be within a different payment provider processor 15(p).

When the payment process is completed correctly, the payment provider processor 15(p) involved informs the transaction operator processor 1. Then, the transaction operator processor 1 informs both the client through a message (e.g. SMS) to his mobile telephone 7(j) and the merchant through a message to his terminal 11(k) that the payment process has been completed correctly.

Sometimes, when the client is within a physical shop of the merchant, after the payment process has been completed correctly, the merchant can give a ticket to the client as a prove that the payment process has been completed correctly and that the merchant has the obligation to deliver a good or service. When the client is not in a shop of the merchant (there may not be any physical shop at all), the client may receive a payment completion number through his mobile telephone 7(j) that can be used by him to prove that the merchant has such an obligation to deliver a good or service.

Now, some examples of mobile transactions that can be supported by the system according to FIG. 1 will be illustrated.

Parking

In a first embodiment, a client has decided to park his car in a zone for which he has to pay a certain amount of money. When he has left his car he sees the zone number which is indicated on a sign. Using his mobile telephone 7(j), he calls the processor 11(k) of the merchant, in this case being a parking provider, and inputs the zone number. When paying in advance, he also inputs the time that he likes his car to be parked. After having inputted the zone number and the time of parking, an automatic payment process will be carried out between the accounts of the client and the parking provider by means of the payment provider processors 15 concerned.

The parking provider may use IVR, SMS, MMS, WAP. I-mode or USSD. Optionally, the client is warned five minutes before termination of the parking time after which the client is allowed to call again to extend his parking time.

Alternatively, the client pays after termination of the parking and when leaving the parking zone. Then, the client uses his mobile telephone 7(j) again when he leaves to inform the parking provider of his leaving. Then, the payment process is carried out after the service has been delivered.

A parking inspector walking through the zone where the client has parked his car uses, for instance, a personal digital assistant for his inspections. He calls the terminal 11(k) via the transaction operator processor 1 with his personal digital assistant and inputs the registration number of the car which is linked to the telephone number of the mobile telephone 7(j) used by the client when paying for the parking. A separate database for parking of the terminal 11(k) includes all the data with respect to cars for which parking has been paid. The personal digital assistant of the parking inspector gets access to this database and can check whether or not this payment has been completed. Such a checking process may only need about ten seconds. Instead of inputting a registration number of the car, the car concerned may be provided with a sticker or the like provided with a bar code. Then, the personal digital assistant is provided with a bar code scanner. The parking inspector scans the bar code and the bar code is transmitted to the transaction operator processor 1. This bar code is related to the mobile telephone number of the client who has paid for the parking by using his mobile telephone. Again, the parking inspector can check whether or not the data in the parking database confirms that the payment has been completed.

Public Transport

A client decides to travel with a tram in a large city. He calls the terminal 11(k) of the merchant, i.e. the public transport provider, via the transaction operator processor 1. He inputs the zone where he got in the tram as well as the number of zones that he likes to travel. This triggers an automatic payment process in a similar way as indicated above. The transaction operator processor 1 informs him via his mobile telephone 7(j) that the transaction is allowed or not, i.e., that he is allowed to travel the indicated number of zones by tram. Such a message can be transmitted to him using SMS. Alternatively, a standard tariff may apply for a number of zones as indicated. This can be done by a client using a USSD code inputted with his mobile telephone 7(j).

When the client in the tram is inspected the inspector requests the client to provide him with the SMS which includes a unique code. The inspector uses his, for instance, personal digital assistant to input this code and transmits this code to the transaction operator processor 1. The code is checked with the database of the public transport provider concerned. Alternatively, the personal digital assistant comprises some key software that is sent to it each day by the database of the public transport provider. Then, the key software checks whether or not the code is valid within about one second and returns the result to the inspector.

As a further alternative, the inspector uses a barcode scanner connected to his personal digital assistant to scan a bar code on the mobile telephone 7(j). This bar code is transmitted to the public transport provider database connected to terminal 11(k) through the transaction operator processor 1. Within seconds the database confirms the validity of the bar code and completion of a payment process.

Vending Machine

A client waiting for, e.g., a train decides to buy a can of juice or a packet of cigarettes. He goes to a vending machine which functions as one of the terminals 11(k) and orders the can of juice using a USSD code inputted with his mobile telephone 7(j). This code is transmitted to the transaction operator processor 1, which automatically routes the data to the payment provider processor 15(p) associated with the mobile telephone, concerned. After the payment provider processor 15(p) has completed the payment transaction it transmits a message to that effect to both the mobile telephone 7(j) and the vending machine. Then, the vending machine may provide the user of the mobile telephone 7(j) with the can of juice as ordered within, e.g., ten seconds.

Petrol

A client desiring his car to be refueled drives to a petrol station. On the petrol pump there is an indication that the client can pay using his mobile telephone 7(j). Moreover, there is a petrol pump number indicated on the petrol pump. The consumer calls the transaction operator processor 1 and inputs the petrol pump number, as well as a PIN. In the same way as is explained above with reference to the vending machine, a payment transaction process is carried out and within, e.g., ten to fifteen seconds the petrol pump is released to provide fuel and the client can start refueling his car.

The payment transaction process can take place in advance. However, then the disadvantage is that a predetermined amount of fuel is to be refueled in the car. Alternatively, the transaction payment process is only carried out after the client has refueled his car and has sent an indication to that effect to the transaction operator processor 1. This may also be done by his mobile telephone 7(j). Alternatively, this is done automatically when the petrol hose has been hung up by the client.

The client can drive away directly after having hung up the petrol hose. The petrol station operator receives a notice from the transaction operator processor 1 indicating that this particular petrol pump is used by a person which uses his mobile telephone for an automatic payment process.

Many other examples are envisaged. For instance, using a mobile telephone 7(j) to pay for pay television, to order tickets for an amusement park, to order a pizza or shopping's at a supermarket.

The system shown in FIG. 1 shows the possibility of organizing separate responsibilities for separate parties. The transaction operator associated with the transaction operator processor 1 need not be responsible for the fulfillment of delivery of goods and/or services by merchants. The merchant himself is responsible and must provide proper communication to the clients. However, since everybody is registered the system provides the possibility of applying rules for both the payment process and the fulfillment process.

The client can complain about the fulfillment of a specified merchant by contacting the client service provider processor 5(i) where he is registered. Such a communication can take place through the Internet or the PSTN, as is known to persons skilled in the art. An IVR supported by the transaction operator processor 1 can support this communication. When a complaint has reached a certain client service provider processor 5(i) regarding the fulfillment of a certain merchant the client service provider associated with that processor 5(i) may contact the merchant service provider processor 13(m) of the merchant service provider were the merchant concerned is registered. This communication will, preferably, take place through the transaction operator processor 1 in order to prevent that, any time a new client service provider processor 5(i) or merchant service provider processor 13(m) is to be connected to the system, new connections have to be made between all existing client service provider processors 5(i) and merchant service provider processors 13(m) and the new ones. The merchant service provider associated with the merchant service provider processor 13(m) receiving repeated complaints about the fulfillment of a certain merchant may, then, disconnect a merchant from the system. Rules for that may be organized in the form of a contract.

During the complaint of a client it may be necessary for a client service provider processor 5(i) to collect all data with respect to the transaction concerned. To that effect, the client service provider processor 5(i) automatically makes a connection with the transaction operator processor 1 to request the data concerned.

It must be known to both the client service provider processor 5(i) and the transaction operator processor 1 who the user is. In most cases, it will be sufficient that the client uses his mobile telephone 7(i), which is provided with a SIM card. As is know to a person skilled in the art, such a card is provided with a PIN that must be used by the client to make use of the mobile telephone 7(j). The mobile telephone 7(j) will be recognized by the system by means of calling line identification (CLI). If an additional security is required, the client may be asked to input a further user name or password.

A merchant having difficulties or complaints can communicate them to his merchant service provider by making a connection between his terminal 11(k) and the merchant service provider processor 13(m) concerned. Such complaints may have a technical character, e.g., related to bad user interfaces or non-working solutions. When the complains are related to a certain transaction, the merchant service provider processor 13(m) can request the transaction operator processor 1 to provide the data related to that transaction.

The complaints of the merchant may also relate to a certain client. When a client really misbehaves, predetermined actions can be taken against him.

The communication between the terminals 11(k) and the merchant service provider processor 13(m) can be done through the Internet or the PSTN or any other telecommunication network known to a person skilled in the art. The communication can be supported by an IVR.

Also the merchant can be requested to identify himself, e.g., by using a username and/or password.

Since any merchant service provider is provided with his own processor 13(m) he may store transaction summaries for every merchant registered with him in a database associated with the processor 13(m). The merchant service provider may thus make his own format for showing transaction details to his merchants.

Note that the merchants can install their own database in their own terminals regarding transaction summaries.

Although the above description has emphasized on using mobile telephones 7(j), in most cases, the invention can also be employed by moving any kind of (tele)communication device, like client terminals 9(j).

The invention claimed is:

1. A system for conducting a business transaction between a client and a merchant comprising:
   a transaction operator processor;
   at least one client communication device;
   at least one payment provider processor configured to perform automated transfers of payment on the client's behalf, separate and distinct from the transaction operator processor;
   at least one client service provider processor, separate and distinct from the transaction operator processor, and configured to store client profile data corresponding to the client, the client profile data including a client ID identifying said client and the at least one payment provider processor that is authorized to perform an automated transfer of payment on the client's behalf, the client service provider processor configured to provide the client profile data to the at least one payment provider processor in response to a request from the transaction operator processor;
   at least one merchant processor configured to receive a client ID and a corresponding order to deliver at least one of a service and product from said client communication device, and responsive receiving said order and said client ID, to send a transaction request to said transaction operator processor;
   wherein said transaction operator processor being configured, responsive to receiving said transaction request from the merchant processor, to request said at least one client service provider processor to communicate said client profile data to said transaction operator processor, receive said client profile data, and to execute the transaction by communicating corresponding transaction payment data extracted from the client profile data to the least one payment provider processor identified within the client profile data as being authorized to perform automated transfers of payment on the client's behalf; and
   wherein the at least one payment provider processor is configured to transfer a payment to the merchant on the client's behalf responsive to receiving the transaction payment data from the transaction operator processor.

2. The system according to claim 1, wherein said client profile data includes a plurality of different authorized payment provider processors, and a financial data list indicating which payment provider processors are authorized to perform said automatic payment transaction in dependence on a price of the transaction.

3. The system according to claim 1, wherein said client profile data includes Merchant Id's indicating merchants at whom particular products and services can be obtained, as well as product Id's indicating said particular products.

4. The system according to claim 1, comprising at least one merchant service provider processor with a memory storing merchant profile data used for said transaction and configured to communicate said merchant profile data to said transaction operator processor during said transaction, said merchant profile data including at least a list of payment methods accepted based, at least in part, on a cost of the at least one of the service and product.

5. The system according to claim 1, wherein the transaction operator processor is further configured to:
   responsive receiving said client profile data from said at least one client service provider processor, sending a checking request to the client communication device associated with said transaction request;
   receiving a confirmation from said communication device; and
   performing the transaction related to said transaction request.

6. The system according to claim 1, wherein the transaction operator processor and the merchant processor are in a trusted relationship.

7. The system according to claim 1, wherein said client ID is a phone number associated with the client communication device or a subscriber identity module (SIM) number stored in a memory of the client communication device.

8. The system according to claim 1, wherein the payment provider processor is further configured to obtain authorization from the client communication device prior to transferring payment on the client's behalf.

9. The system according to claim 1, wherein the client profile data further includes information including answers to access/approval menus for obtaining access to the payment provider processor.

10. The system according to claim 9, wherein the information includes at least a username and password.

11. The system according to claim 1, wherein the merchant processor is configured to receive the order to deliver from said client communication device by, at least in part, receiving a phone call or SMS message from the client communication device at a predetermined phone number matching dialed digits entered at the client communication device.

12. The system according to claim 1, wherein said client communication device is a mobile phone, and wherein the mobile operator providing wireless service to the mobile phone also provides the client service provider processor.

13. A method of performing a business transaction between a client and a merchant comprising:
   a client communication device sending an order to a merchant processor to deliver one of a product and service and providing the merchant processor with a client ID for identifying the client;
   the merchant processor receiving the order and client ID and sending a transaction request to a transaction operator processor;
   the transaction operator processor receiving the transaction request and sending a request for client profile data to a client service provider processor provided with a memory for storing client profile data, the client profile data including at least the client ID identifying the client and a payment provider processors list identifying at least one payment provider processor that is authorized to perform an automated transfer of payment on the client's behalf the client service provider processor, separate and distinct from the transaction operator processor, sending the client profile data to the transaction operator processor in response to receiving the request for client profile data;

the transaction operator processor receiving the client profile data associated with said client and executing the transaction by communicating corresponding transaction payment data extracted from the client profile data to the at least one payment provider processor identified within the client profile data, and the payment provider processor, being separate and distinct from the transaction operator processor, responsive to receiving the corresponding transaction payment data from the transaction operator processor, transfers a payment to the merchant on the client's behalf.

14. The method according to claim 13, wherein said client ID is a phone number associated with the client communication device or a subscriber identity module (SIM) number stored in a memory of the client communication device.

15. The method according to claim 13,
wherein said client profile data includes a plurality of payment provider processors authorized to perform an automated transfer of payment on the client's behalf, and
wherein said financial data list indicates which payment provider processors are authorized to perform said automatic payment transaction in dependence on a price of the transaction.

16. The method according to claim 13, wherein the payment provider processor is further configured to obtain authorization from the client communication device prior to transferring payment on the client's behalf.

17. The method according to claim 13, wherein the client profile data further includes information including answers to access/approval menus for obtaining access to the payment provider processor.

18. The method according to claim 13, wherein the information includes at least a username and password.

19. The method according to claim 13, wherein the merchant processor is configured to receive the order to deliver from said client communication device by, at least in part, receiving a phone call or SMS message from the client communication device at a predetermined phone number matching dialed digits entered at the client communication device.

20. The method according to claim 13, wherein said client communication device is a mobile phone, and wherein the mobile operator providing wireless service to the mobile phone also provides the client service provider processor.

21. A system for conducting a business transaction between a client and a merchant comprising:
- a transaction operator processor operated by a trusted third party;
- at least one client communication device;
- at least one payment provider processor configured to perform automated transfers of payment on the client's behalf;
- at least one client service provider processor, separate and distinct from the transaction operator processor, configured to store client profile data corresponding to the client, the client profile data including a client ID identifying said client, the at least one payment provider processor that is authorized to perform an automated transfer of payment on the client's behalf, and answers to access/approval menus for obtaining access to the payment provider processor, the client service provider processor configured to provide the client profile data to the at least one payment provider processor in response to a request from the transaction operator processor;
- at least one merchant processor, separate and distinct from the transaction operator processor, configured to receive a client ID and a corresponding order to deliver at least one of a service and product from said client communication device, and responsive receiving said order and said client ID, to send a transaction request to said transaction operator processor;
- wherein said transaction operator processor being configured, responsive to receiving said transaction request from the merchant processor, to request said at least one client service provider processor to communicate said client profile data to said transaction operator processor, receive said client profile data, and to execute the transaction by communicating corresponding transaction payment data extracted from the client profile data to the least one payment provider processor identified within the client profile data as being authorized to perform automated transfers of payment on the client's behalf; and
- wherein the at least one payment provider processor is configured to transfer a payment to the merchant on the client's behalf responsive to receiving the transaction payment data from the transaction operator processor.

* * * * *